C. M. CAMBA.
TRAFFIC SIGNAL.
APPLICATION FILED SEPT. 11, 1920.

1,376,398.

Patented May 3, 1921.
2 SHEETS—SHEET 1.

Inventor
Carlos M. Camba

By Lacey & Lacey, Attorneys

C. M. CAMBA.
TRAFFIC SIGNAL.
APPLICATION FILED SEPT. 11, 1920.
1,376,398.
Patented May 3, 1921.
2 SHEETS—SHEET 2.
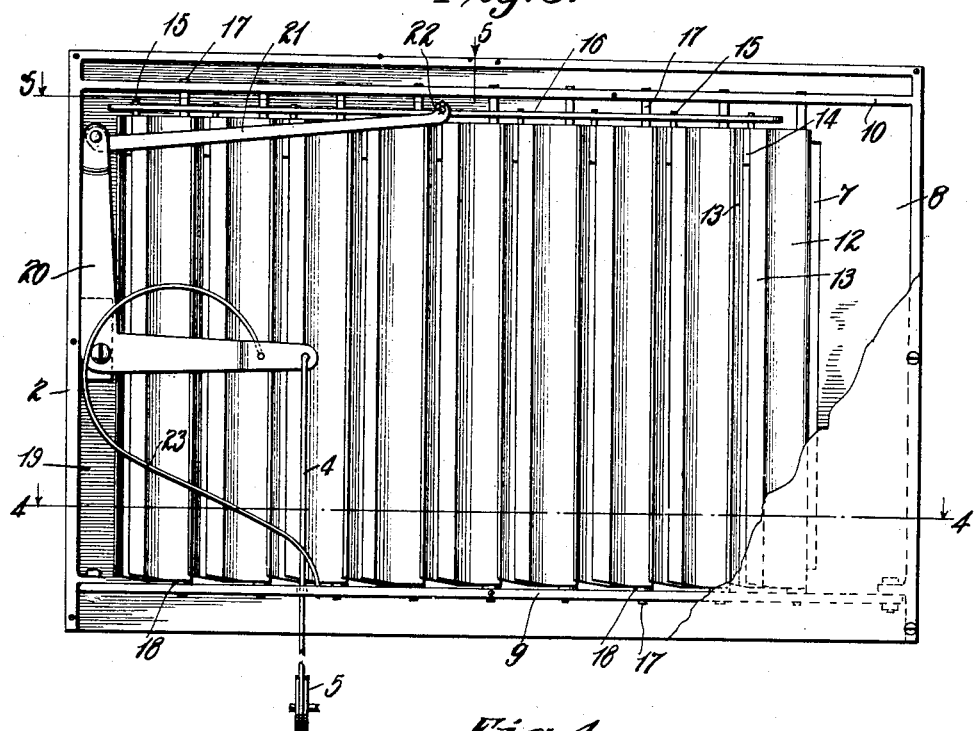
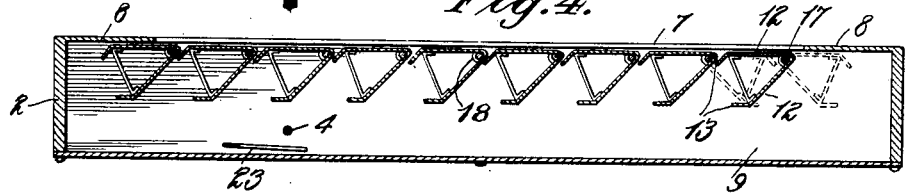
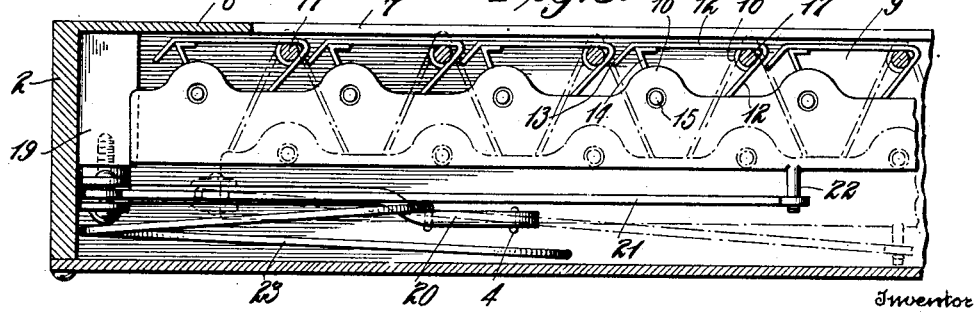
Inventor
Carlos M. Camba
By
Lacy & Lacy, Attorneys

UNITED STATES PATENT OFFICE.

CARLOS M. CAMBA, OF HABANA, CUBA.

TRAFFIC-SIGNAL.

1,376,398.   Specification of Letters Patent.   Patented May 3, 1921.

Application filed September 11, 1920. Serial No. 409,728.

*To all whom it may concern:*

Be it known that I, CARLOS M. CAMBA, a subject of the King of Spain, residing at Guanabacoa Town, in the city of Habana and Republic of Cuba, have invented certain new and useful Improvements in Traffic-Signals, of which the following is a specification.

This invention relates to signals and is designed primarily for use upon the rear ends of motor vehicles to notify following vehicles of the intentions of the chauffeur so that the vehicles in the rear of the one equipped with the signal may avoid collision therewith. The device may be utilized also as a signal to control traffic at street crossings. The invention is illustrated in the accompanying drawings and will be hereinafter fully described, the novel features being subsequently particularly pointed out in the appended claims.

In the drawings—

Fig. 3 is an enlarged rear elevation of the signal;

Fig. 4 is a longitudinal horizontal section on the line 4—4 of Fig. 3;

Fig. 5 is an enlarged section on the line 5—5 of Fig. 3;

Figure 1:
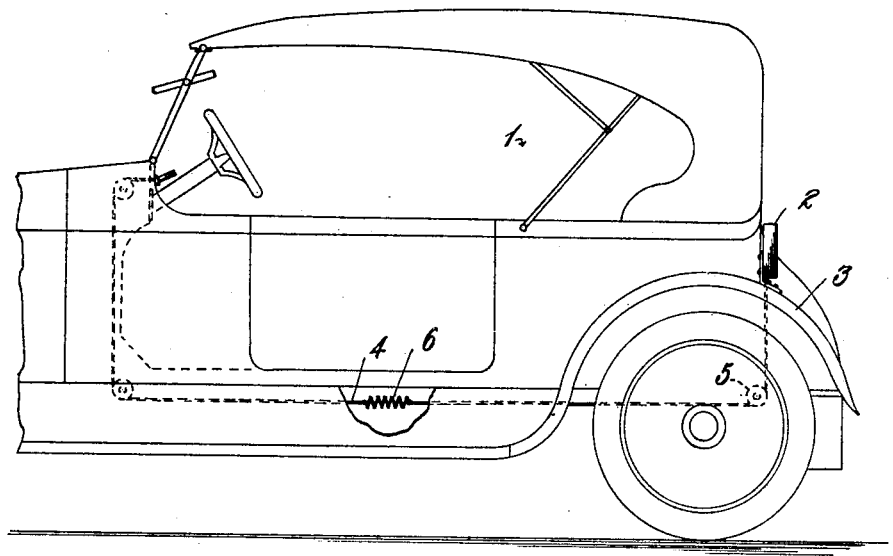
Figure 1 is a side elevation, partly broken away, of an automobile having my improved signal applied thereto.

The automobile 1 may be of any well-known type. In equipping the automobile with my invention, I secure a casing 2 to the rear mud guard 3 in any convenient manner and extend an operating cable 4 from the apparatus around a pulley 5 at the rear of the automobile and thence forwardly to the dash, a spring 6 being interposed in the length of the said cable at any convenient point so that when the device is operated sudden strains upon the cable will be avoided and the liability of the same to break therefore minimized. In the embodiment of the invention illustrated in the drawings, the casing 2 is provided in its rear side with a sight opening 7 at the ends of which the rear wall of the casing presents stop members 8 to limit the movement of the movable display elements. The front end, top and bottom of the casing are all closed and the bottom plate 9 thereof constitutes a support for the lower trunnions of the display elements, while the upper trunnions of said elements are mounted in a supporting plate 10 extending between the end walls of the casing below the top thereof, this arrangement being preferred in order to permit the top of the device to be given a somewhat ornamental appearance when so desired. The display elements 11 may be formed from sheet metal plates or blanks folded longitudinally upon themselves to present diverging wings or blades 12, the free edges of which are bent slightly inwardly, as shown at 13, whereby to impinge against the adjacent face of the adjoining display element and thereby aid in limiting the swinging movement as will be readily understood on reference to Figs. 4 and 5. Braces 14 are secured to and extend between the diverging wings 12 of the display elements immediately adjacent the stop flanges 13 and upon each of said braces is an upstanding pin 15 which is pivotally fitted in a link 16 which thereby forms a swinging connection between all the elements so that swinging movement imparted to any one element or to the link will cause an equal simultaneous movement of all the elements. In the angle defined by the blades or wings 12, I rigidly secure the trunnions or pivot rod 17 which may conveniently extend the entire height of the element and project beyond the upper and lower ends thereof. Near the lower end of each trunnion or pivot rod is a collar 18 which is fixed thereon and adapted to rest upon the bottom plate 9 so that the dropping of the trunnion through the plate will be prevented and the display elements consequently supported so that the inscription thereon will be displayed in a straight line and, therefore, easily read. The upper trunnions or the upper ends of the several pivot rods are pivotally fitted in the supporting plate 10, as clearly shown in Fig. 3. The plate 10 may be formed integral with the end walls of the casing but the lower plate 9 is preferably removable, as clearly shown in Fig. 3 so as to facilitate the assembling of the apparatus. At one end of the casing is a post 19 upon which is fulcrumed an angle lever 20, the cable 4 being secured to the free end of the lower arm of said lever, as shown clearly in Fig. 3. A connecting rod 21 is pivoted at one end to the upper end of the lever 20 and at its opposite end is pivotally engaged upon a pin or stud 22 projecting from the edge of the link 16. It is obvious that the display elements swing in a horizontal plane about their respective pivots 17 and the link 16, of course, follows said movement so that the connecting rod 21 and the angle lever 20 might bind and clog the operation, but to accommodate the relative angular movement and prevent such binding I form the respective pivots and the openings through which they pass of such relative dimensions that the pivots will fit loosely in the respective members and permit sufficient play to accommodate the different relative positions and avoid binding of the parts. The display elements and the lever 20 are held in their normal positions by a spring 23 which may be of any preferred type and is illustrated as a bowed wire or light resilient rod having one end secured in the bottom plate 9 of the casing and its opposite end secured to the lever near the point of connection of the cable 4, as shown in Fig. 3. When a pull is exerted upon the cable and the lower arm of the lever swung downwardly the spring is obviously put under tension so that when the cable is released the spring will expand and incidentally and automatically return the lever to its initial position.

Figure 2:
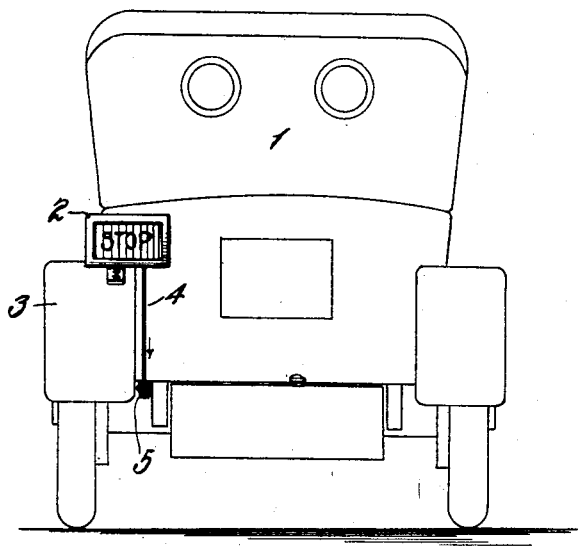
Fig. 2 is a rear end elevation thereof.
Figure 6:
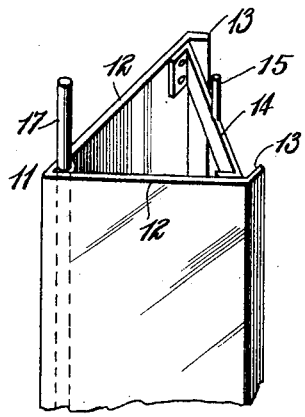
Fig. 6 is a detail perspective of the upper end of one of the swinging display members of the apparatus.

As will be readily understood upon reference to Figs. 4 and 5 of the drawings, the blades 12 of the several display members will be held across the sight openings 7 of the casing parallel with the face of the casing so that an inscription placed upon the said faces may be read through the sight opening. Obviously, two display surfaces are provided by the apparatus and upon these surfaces may be painted or otherwise displayed inscriptions indicating an intention to stop or to go ahead and in the practical application of the invention I paint or otherwise display upon those faces of the blades which appear across the sight opening in Fig. 4 letters which together will spell the word "Go" or some equivalent thereof and upon those faces which are not displayed in said figure, I place letters spelling the word "Stop" or its equivalent. In Fig. 2, the word "Stop" is shown displayed so that the manner of placing the letters will be clearly understood. It will be noted that the letters may be formed partly upon each of two adjacent faces so that the display signal may be of sufficient size to be easily read and, if desired, the background of the converging faces may be of different colors so that the colors in themselves will form indicators to notify following vehicles whether they should stop or may safely go ahead.

Normally, the word "Go" will be displayed by the device but if it be intended to stop a pull will be exerted upon the cable 4 and the angle lever 20 will, therefore, be swung about its pivot, the upper arm of the lever swinging inwardly from the end of the casing and consequently pushing upon the link 16 through the connecting rod 21 so that through the engagement of said link with the pins 15 the display elements will be swung about their pivots 17 and the displayed blades thereof will be swung into the casing and the previously hidden blades brought into position across the sight opening as will be readily understood upon reference to the dotted lines in Figs. 4 and 5. When the pull upon the cable 4 is released, the parts are at once returned to their initial positions through the action of the spring 23, as previously stated.

It will be readily noted that I have provided a signal apparatus in which two signals are arranged in exceedingly compact form in such a manner that either signal may be quickly brought into the display position without affecting the operativeness of the other signal. The device is easily operated and may be produced at a low cost and is free of complicated constructions or arrangements which would tend to get out of order.

It is to be understood that the accompanying drawings are illustrative only and not restrictive. Obviously, the cable 4 may be attached to the brake lever so that the "stop" signal will be displayed simultaneously with the application of the brake and other changes may be made in the minor details without departing from the spirit of the invention as the same is defined in the following claims.

Having thus described my invention, what is claimed as new is:

1. In an apparatus for the purpose set forth, the combination of a casing having a sight opening, a series of display elements having diverging wings and provided at the free edges of said wings with inwardly projecting stop flanges, pivots at the junctions of the wings at the upper and lower ends thereof, a link pivotally connected to the upper ends of all said elements, and means within the casing between the back wall of the same and the link and connected to the rear edge of the link to oscillate the link and swing the elements about said pivots whereby to bring corresponding wings into alinement, the stop flanges on said wings being adapted to engage the wings which are out of alinement whereby to limit the swinging movement.

2. In an apparatus for the purpose set forth, the combination of a casing having a sight opening, a series of display elements pivotally mounted adjacent said sight opening and provided with diverging wings to be brought into alinement across said opening, braces extending between the free edges of said wings, pins rising from said braces, a link pivotally engaging all said pins, a vertically disposed angle lever pivoted at its angle within the casing below the said link, a connecting rod pivoted to upper extremity of said lever and to said link, an operating member secured to the lower extremity of the angle lever, and a spring secured to the casing and to the lower arm of the angle lever whereby to normally hold the parts in a set position.

In testimony whereof I affix my signature.

CARLOS M. CAMBA. [L. S.]